P. A. FOLEY.
LINED PIPE FLANGE FORMING MACHINE.
APPLICATION FILED FEB. 5, 1919.
1,396,179.
Patented Nov. 8, 1921.
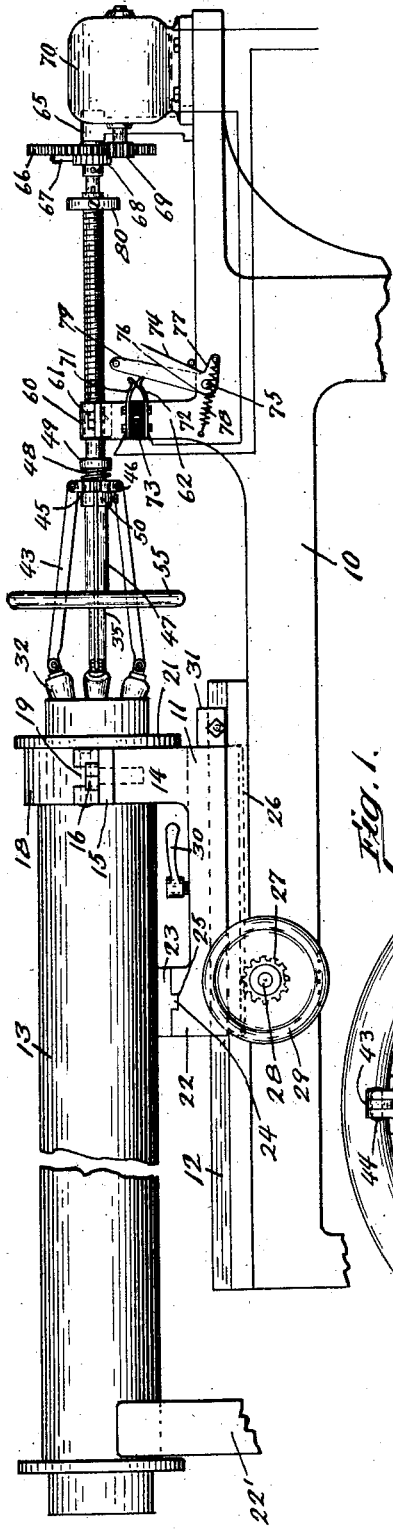
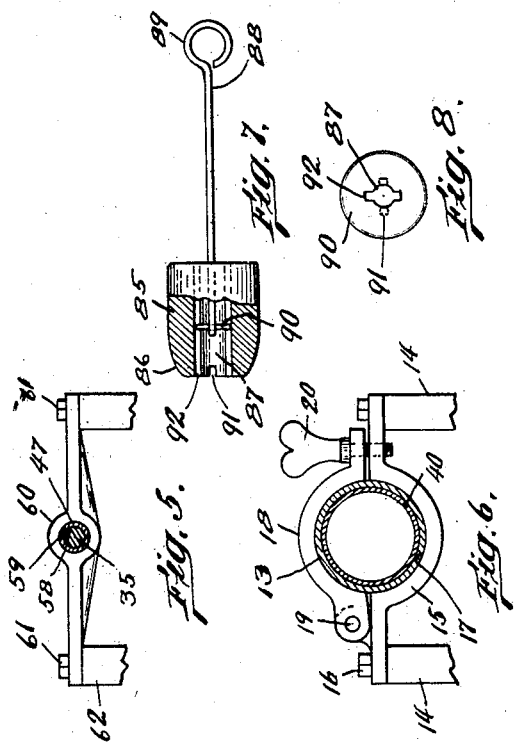
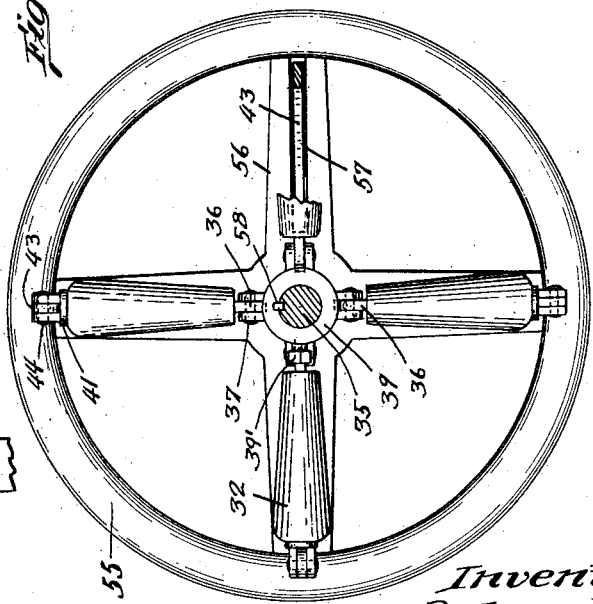

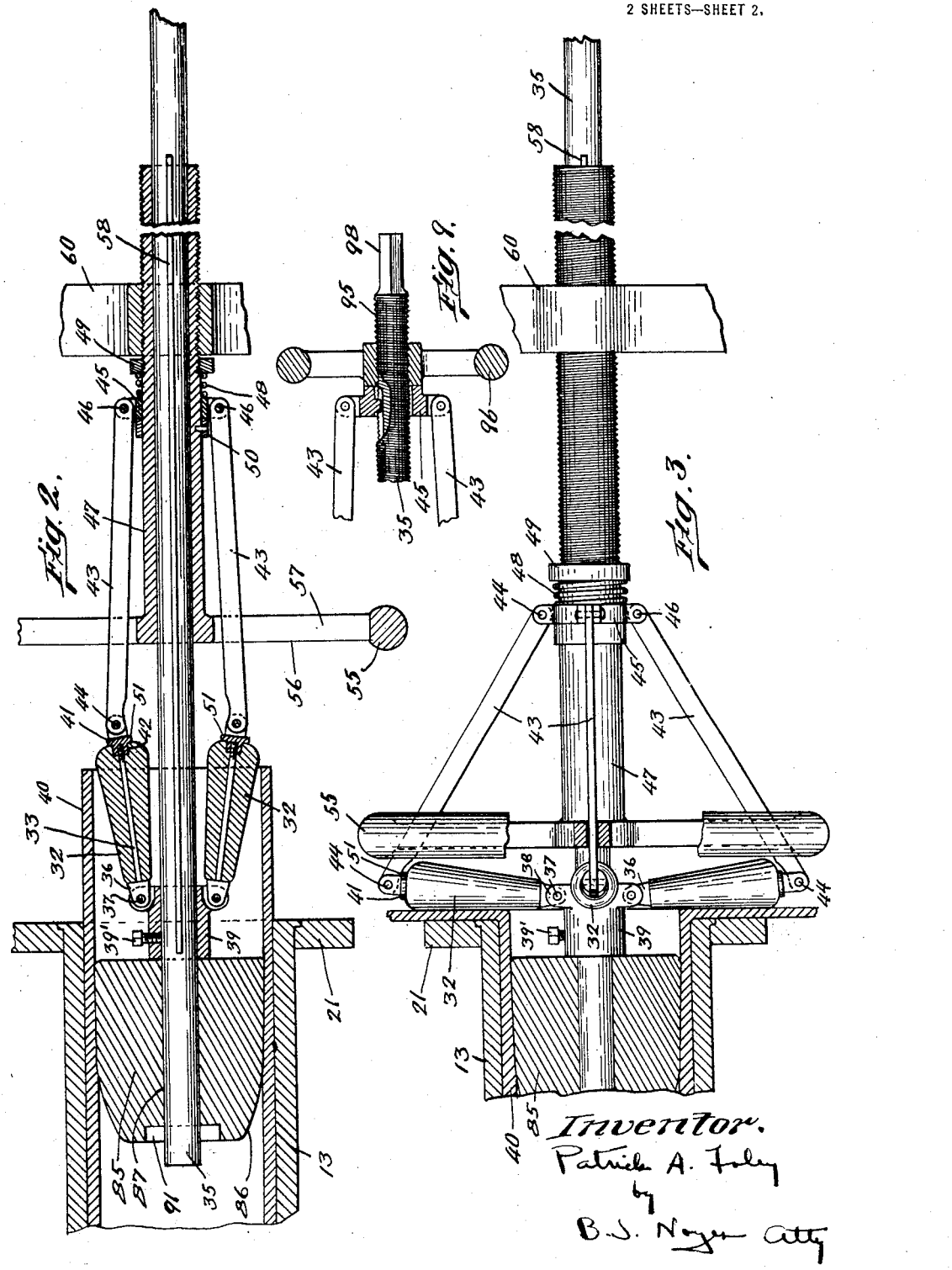

UNITED STATES PATENT OFFICE.

PATRICK A. FOLEY, OF MILTON, MASSACHUSETTS.

LINED-PIPE-FLANGE-FORMING MACHINE.

1,396,179.  Specification of Letters Patent.  Patented Nov. 8, 1921.

Application filed February 5, 1919. Serial No. 275,253.

*To all whom it may concern:*

Be it known that I, PATRICK A. FOLEY, a citizen of the United States, and resident of Milton, in the county of Norfolk and State of Massachusetts, have invented an Improvement in Lined-Pipe-Flange-Forming Machines, of which the following is a specification.

My invention relates to lined flanged pipe and has more particular reference to the forming of flanges on the lining of such pipe.

Lined, flanged pipe of the type with which my invention is more particularly concerned may comprise an outer pipe or casing of steel having flanges at the ends thereof which may be integrally formed with, or expanded on, the pipe, and an inner pipe or lining of lead. The inner lining is essentially a pipe, the outer diameter of which is sufficiently smaller than the inner diameter of the steel pipe or casing to permit its being easily inserted therethrough, and the length of such pipe or lining is arranged to be such that, when said lining is in place, there is a length of lining extended beyond the steel pipe or casing, at each end, which is formed into a flange; and it is with the forming of such a flange that my invention is concerned.

The forming of flanges on the lining of flanged pipe, at least in the larger sizes of pipe with which this invention is concerned, has heretofore been accomplished by hand, and the portion of the pipe lining extended beyond the pipe flanges has been expanded by repeated blows of a mallet or similar implement to the desired shape.

This method of forming the flange has several disadvantages. It is a relatively slow and tedious operation. Repeated blows upon the lining render the metal crystalline, and brittle and easily broken. It is difficult to distribute the blows uniformly and relatively hard and soft spots are consequently formed in the flange, resulting in its distortion. The face of the flange so formed is not as smooth as is desirable and may permit leakage of fluid between two adjacent sections of flanged pipe so formed; or the face of the flange must be finished smooth, after it is formed, to thereby provide for a fluid tight connection between adjacent sections.

The object of my invention is in the provision of a machine by which the flange on the lining of varying dimensions of lined flanged pipe may be automatically and quickly and consequently cheaply rolled into shape, and the flange may be of uniform density, structure and strength throughout and be formed with a smooth surface.

A machine constructed in accordance with my invention may comprise a support for the pipe, a power driven operating shaft adapted to be arranged in line with the axis of the pipe, a plurality of rollers carried by said shaft and rotatable therewith and engageable with the lining of the pipe, a roller expanding screw adapted to force the rollers into a substantially vertical position with respect to said shaft and as said shaft is rotated, to thereby expand the lining and roll it against the flange on the casing and form the flange on the lining.

Figure 1 is an elevation of a machine embodying my invention.

Fig. 2 is a plan detail, in section, along the axis of the machine of Fig. 1 and illustrating the relative disposition of the rollers and pipe previous to the operation of the machine for the forming of the flange.

Fig. 3 is a view similar to Fig. 2 but with the flange rollers in expanded position as at the end of the flange forming operation.

Fig. 4 is an end view along the line of the operating shaft and illustrating the rollers in expanded position and the roller return wheel.

Fig. 5 is a detail of the roller advancing screw block.

Fig. 6 is a detail of the pipe support and clamp.

Fig. 7 is a detail of the pipe bearing for the operating shaft and its extracting tool.

Fig. 8 is an end view of the pipe bearing of Fig. 7.

Fig. 9 is a detail illustrating a modified form of machine embodying my invention.

As here shown, the machine in which my invention is incorporated comprises the frame 10 adapted to support the various components of the machine.

A pipe support 11 is provided, which is slidably arranged on the gibs or ways 12 of the frame 10, whereby a pipe 13 secured therein may be moved toward or away from the flange forming rollers for the removal of the flanged pipe and the insertion of an unflanged pipe therein. Said pipe support is formed with two uprights 14 between which a cradle 15 is extended and secured by bolts 16. Said cradle has a pipe receiving recess or depression 17 therein adapted to conform to the outer diameter of a particular pipe. For the forming of flanges on the linings of pipe of differing diameters, a separate cradle for each particular size of pipe may be provided, and which are adapted to be secured to the pipe support.

A clamping member 18, curved to also conform to the diameter of a particular pipe is pivoted to the cradle at 19 and a wing-nut 20 is arranged to securely clamp said member 18 over the pipe to thereby hold the pipe firmly in place. The flange 21 of the pipe is adapted to abut against the inner face of the cradle, or the uprights 14 of the support, to thereby prevent a longitudinal movement of the pipe under any thrusting effort that the rollers may exert on the lining of the pipe in the operation of forming the flange.

By means of the wing-nut 20 the clamping member 18 may be quickly and easily unclamped to be swung away from the pipe to permit the removal of pipes from and insertion in the cradle. The pipe support at its outer end is provided with a pipe rest 22 suitably spaced from said upright and cradle. Said rest may be of such height as to engage a particular pipe and support it, or it may have a plate 23 detachably secured thereto as by the key 24 carried by said plate slidably engaging the groove 25 in said pipe rest 22 whereby plates of varying height may be arranged on said rest to support pipes of varying diameters.

The pipe support shown is adapted to clamp and support pipes of moderate lengths. For pipes of extreme lengths, or for curved pipes, an auxiliary supporting means for the end thereof, as indicated at 22', may be provided.

It is desirable that the pipe support with the pipe secured therein be movable relative to the flange forming rollers in order that the pipe may be moved away from said rollers and associated parts to permit the removal of the pipe from the support and the insertion of another pipe therein.

For this purpose the pipe support may be provided with a rack 26 which is adapted to be engaged by a gear 27 fixed to a shaft 28 journaled in the frame 10 of the machine. The hand wheel 29 is fixed to said shaft and by the rotation of said hand wheel the pipe support may be moved on its ways 12. A clamping lever 30 may be provided to securely clamp the pipe support in any desired position. A stop member 31 may be fixed to the ways or gibs 12 or any other convenient part of the machine to limit the movement of the pipe support toward the rollers to thereby regulate the thickness of the flange formed on the lining of said pipe.

The flange forming rollers comprise a plurality of tapered or cone shaped pieces 32 rotatably mounted on pins 33 by means of which they are secured to the operating shaft 35. Said rollers are preferably formed of some suitable wood as, for instance, lignum-vitae, as such wood has been found to be the most satisfactory for work on such soft, ductile metals as are employed in the lining of the pipes under consideration although it is obvious that the material composing the rollers will be chosen with due regard to the particular metal and the nature of the work.

The outer ends of said pins or rods 33 are provided with an enlarged portion 36 either integrally formed thereon or secured thereto and are pivoted at 37 between ears 38 extended from a sleeve 39 which is fixed by a set screw 39' to said operating shaft 35.

As here shown four flange-forming rollers are provided arranged at substantially right angles to each other and the number, in any particular case, will depend upon the nature of the work.

By the construction above described, the rollers are constrained to rotate with the shaft 35 and the inner ends are adapted to be moved or expanded outwardly to engage the extended lining 40 of the pipe 13 to expand it into contact with the flange 21 thereof. The outer ends of said rods or pins 33 are screw-threaded into pivot members 41. Said members are formed with a reduced shank portion 42 fitting within an extending counter-sunk portion in the rollers and about which the rollers are adapted to freely rotate. The levers 43 are pivoted at 44 to said pivot members and extend to a ring 45 to which they are pivoted at 46. Said ring 45 is slidable on a sleeve 47 which forms the roller thrust sleeve and which in turn is slidably arranged on the operating shaft 35 and, as here shown, is constrained to rotate therewith.

A compression relief spring 48 is arranged over said sliding sleeve 47 between said ring 45 and a collar 49 fixed to said sleeve 47 and forms means whereby the thrust of said sleeve 47 is transmitted to said ring 45 to operate to expand the outer ends of said rollers and which serves to prevent an excessive force to act upon said rollers. A ring 50 secured to the sleeve 47 on the other side of said ring 45 restricts the movement of said ring under the thrusting force of said spring 48.

In the operation of the machine the rollers are adapted to be moved from their position shown in Fig. 2 to that shown in Fig. 3 and it is desired that after the rollers have been moved into substantially the position shown in Fig. 3 that further expansive movement of the rollers be prevented.

For this purpose, the pivot members 41 are provided with shoulder portions 51 of such diameter that when the lining-engaging face of the rollers is substantially perpendicular to the axis of the operating shaft, and also to the axis of the pipe, that said flanges 51 will be engaged by the links 43 to thereby prevent further movement of the rollers and consequently the possibility of distortion of the correctly formed flange. Any further movement of the sleeve 47 is designed to be taken up by the relief spring 48. A roller return wheel 55 is secured to the end of said thrust sleeve 47 between the rollers and the relief spring 48 by which the thrust sleeve 47 may be rotated to return the rollers to their original position. Said wheel is provided with four arms 56 which are formed with slots 57 therein through which the links 43 are extended. Said arms thereby form supports for said links 43 to prevent the bending and straining of said links due to the rotation of said shaft 35 in the operation of forming a flange.

The operating shaft 35 is provided with a key or spline 58 which engages a splineway in the thrust sleeve 47 and forms means by which said sleeve is constrained to rotate with said shaft. Said thrust sleeve 47 is provided with a threaded portion 59 which is adapted to be threaded in a stationary thrust block 60 by means of which said sleeve 47 may be moved toward the pipe and the flange forming rollers expanded when the operating shaft 35 is rotated. Said thrust block 60 is bolted by screws 61 to uprights 62 extended above the frame of the machine.

Said operating shaft 35 is journaled at its end remote from the flange forming rollers in a bearing 65 secured to the frame of the machine. A gear 66 is loosely mounted on said shaft and bears a pawl 67 adapted to engage a ratchet 68 fixed to said operating shaft 35. Said gear is adapted to mesh with a pinion 69 secured to the shaft of a motor 70 carried by the frame of the machine and by which the apparatus is driven.

Said pawl and ratchet mechanism form means whereby the motor 70 may rotate the operating shaft in one direction and permit the rotation of said shaft in the opposite direction independently of the motor. By this means the flange-forming rollers may be returned to their original position by the manual rotation of said roller return wheel 55 without the necessity for rotating the rotor of the motor 70 which otherwise would involve the expenditure of considerable effort. It is obvious, however, that the pawl and ratchet mechanism may be dispensed with if desired or that other mechanism to accomplish the above result may be employed.

After the rollers have been expanded into their flanged formed position and further rotation of the operating shaft has operated to compress the relief spring it is desirable to stop the motor and prevent further operation of the mechanism.

The control of the motor may be, of course, manually performed or it may be automatically performed and as here shown an automatic means is provided.

A switch, including two stationary switch contact members 71 and 72 insulated from each other by the insulating block 73, is secured to any convenient part of the structure and arranged to be in the motor circuit. Said contact members are arranged to be normally in contact to thereby close the motor circuit. A switch arm 74 is pivoted at 75 to a component part of the frame of the machine and bears an insulated block 76 which is adapted to be moved between said contact members 71 and 72 to thereby interrupt the motor circuit and stop the motor.

An arm 77 at right angles to said arm 74 has a spring 78 so connected thereto that a quick opening and closing of the switch is accomplished. An arm 79 arranged to move conjointly with said switch arm 74 is extended in proximity to the thrust sleeve 47. A collar 80 is adjustably secured to the threaded portion 59 of said thrust sleeve 47 and at the desired limit of movement in one direction of said thrust sleeve is adapted to engage said arm 79 to thereby cause the spring 78 to actuate the switch arm 74 to interrupt the motor circuit. Due to the deenergization of the motor, the mechanism stops and, by the manual operation of the roller return wheel 55, the rollers and associated mechanism may be returned to normal position. When it is desired to again start the apparatus the arm 79 is adapted to be manually operated and moved toward the right, Fig. 1, to thereby close the motor circuit and cause the energization of the motor.

Although the operating shaft 35 is supported at its motor end in the bracket 65 and at an intermediate portion through the thrust sleeve 47 in the thrust block 60, yet it is desirable that the outer end of said shaft or that portion adjacent the flange-forming rollers also be supported in order that the flange-forming rollers may be held rigidly in position in the operation of forming the flange.

For this purpose a plug bearing 85 is inserted in the end of the pipe, previous to the clamping of the pipe in the pipe support 11. Said plug bearing is formed with an outer diameter adapted to snugly fit the lining of the pipe and has a tapered front portion 86 to facilitate its introduction into the pipe. Said bearing is formed with a central journal portion 87 arranged to receive the end of the operating shaft 35.

While it is not difficult to insert said bearing 85 in the end of the pipe, its removal therefrom presents considerable difficulty, especially if the pipe operated upon is bent.

For this purpose an extracting tool is provided which is essentially a rod 88 having a handle portion 89 and provided with a pin 90 at its other end perpendicular to the portion 88. Said tool is adapted to be extended through the central opening 87 therein and engage the slots 91 in the forward end thereof and on each side of said central opening, whereby a uniform extracting pressure may be applied to the plug.

To permit the insertion of the extracting tool said opening 87 is provided with two grooved portions 92 of such depth as to permit the passage of the tool. Said grooved portions 92 are preferably at substantially right angles to the notches 91. The operation of the extracting tool is obvious.

In the operation of forming a flange on lined, flanged pipe with the machine above described the bearing is inserted in the end of the pipe, and slightly in from the flange on the lining of said pipe. The particular distance depends upon the length of the hub 39 to which the flange-forming rollers are pivoted and upon the diameter of the rollers. The pipe is then clamped in the pipe support 11 which has been previously moved toward the left, Fig. 1, and away from the flange-forming rollers.

A suitable cradle and a suitable plate 23 is secured to the pipe support 11 so that the axis of the pipe will coincide with the axis of the operating shaft 35. Said pipe support is thereupon moved forward by means of the wheel 29 until the operating shaft 35 is received in said bearing block 85 and the flange-forming rollers are within the extended end of the lining 40 of the pipe. The stop-member 31 may serve to limit the extent of forward movement of the support.

The flange-forming rollers have previously been retracted to positions shown in Figs. 1 and 2 and the switch arm 74 is in such position that it separates the switch contact members 71 and 72 and thereby prevents the energization of the motor.

To cause the operation of the device said switch arm is moved toward the right, Fig. 1, to permit said contact members 71 and 72 to be moved into contact and the motor to be consequently energized. The operating shaft 35 and the thrust sleeve 47 are consequently rotated and the flange-forming rollers are also revolved. Due to the rotation of the thrust sleeve 47 in the screw-block 60 the rollers, in their rotation with the shaft 35, are slowly expanded and as they roll in contact with the extended portion 40 of the lining slowly expand the same, and force the outer edge thereof outward and against the flange of the casing of the lining.

The pitch of the thread on the threaded portion 59 of the thrust sleeve is adapted to be relatively fine whereby the rate of expansion of the flange-forming rollers is relatively small even with a comparatively rapid rate of rotation of said operating shaft, whereby the pressure exerted on the lining is comparatively small and yet the flange may be quickly formed.

During the flange-forming movement of the rollers the tension of the relief spring 48 is arranged to be such that it is inappreciably compressed by any ordinary resistance to the flange-forming operation.

When, however, the rollers have been moved into substantially vertical position and have satisfactorily formed the flange on the lining of the pipe and the links 43 have been moved into contact with the flanges 41 of the roller supports, to prevent further expansion of said rollers, further movement of the thrust sleeve 47 compresses the relief spring 48 and thereby prevents the rollers and actuating mechanism from being unduly strained.

The collar 80 is now adapted to contact with the arm 79 of the control switch to move the insulating plug 76 between the contact members 71 and 72 of the switch thereby interrupting the motor circuit and thereby stopping the apparatus. The hand wheel 55 may now be manually operated to rotate the thrust sleeve 47 in the opposite direction to thereby return the flange forming rollers to their initial position. This return is easily performed and without much effort for the reason that the pawl and ratchet mechanism connecting the operating shaft 35 with the shaft of the motor 70 serves to permit the rotation of said shaft independently of said motor and the gears associated therewith. The pipe support 11 may now be unclamped and moved backward sufficiently to cause the withdrawal of the bearing block 85 from the end of the operating shaft 35 to thereby permit the removal of the pipe from the pipe support.

The plug bearing may now be removed by the extracting tool 88 and inserted in another length of pipe in readiness for the forming of a flange on the lining thereof.

If it is desired that the corners of the flange of lined pipe, flanged by the machine above described be relatively rounding then the pipe is so initially positioned relative to the rollers that the rollers are initially within the pipe and a suitable distance and are withdrawn therefrom, or the pipe is backed away therefrom, during the flange-forming operation. By suitably regulating the withdrawal of the pipe a rounded edge at the junction of the flange and lining may be formed. The radius of the curve depends upon the distance the rollers are initially positioned within the pipe.

A modified form of apparatus constructed in accordance with my invention is shown in Fig. 9. In this modification the operating shaft 35 is provided with a threaded portion 95 and a hand wheel 96, comprising a screw-block, is threaded on said portion 95 and adapted to engage the end of the ring 45 to the links 43 for the expansion of the rollers.

The shaft 35 may be provided with a squared end portion 98 for engagement with a suitable turning member by which the shaft is rotated. In the operation of this modification, with the rollers in their initial position as shown in Fig. 2, the shaft 35 is rotated and the hand wheel 96 is grasped by the hand and held from rotating. The threaded portion 95 of the operating shaft operates to advance the hand wheel along the shaft and thereby expand the flange-forming rollers. When the rollers have been moved to any desired position the wheel may be released from the hand and further expansion of the rollers ceases.

This modification has certain advantages over the previous modification in that the feed of the rollers or their rate of expansion is independent of the pitch of the threaded portion 95 of the operating shaft as the hand wheel 96 may be permitted to slip in the hand and therefore the rollers may be expanded at a relatively slow rate even though the speed of the operating shaft and the pitch of the threaded portion is relatively great.

It is obvious that other forms and modifications of my invention may be arranged without departing from the spirit of my invention.

I claim:

1. A pipe-flange forming machine comprising an operating shaft, a plurality of rollers disposed about and pivoted at one end to said shaft and rotatable therewith, a threaded sleeve keyed to said shaft arranged for axial movement thereon, a fixed screw block in which said sleeve is threaded, and means extended between said sleeve and the other end of said rollers to expand and retract them.

2. A lined-pipe flange-forming machine comprising an operating shaft, a plurality of elongated rollers axially disposed on said shaft, means pivotally supported by said shaft arranged rotatably to support said rollers, and means to expand said rollers including a hand-wheel arranged to be moved axially on and by said shaft and held manually against rotation to expand the rollers and be rotated manually on said shaft to retract said rollers.

3. A pipe-flange forming machine, comprising an operating shaft, a plurality of flange-forming rollers rotatable therewith having one end pivoted to said shaft and means actuated by said shaft to expand said rollers arranged to admit of continued rotation of said shaft when the rollers are in a fully expanded position.

4. A pipe-flange forming machine, comprising an operating shaft, a plurality of flange-forming rollers rotatable therewith and pivoted at one end thereto, a thrust ring disposed on said shaft, links pivoted to the other end of said rollers and to said thrust ring, means to move said thrust ring axially on said shaft to expand and retract said rollers and means rotatable with said shaft arranged to support said links intermediate their ends.

5. A pipe flange-forming machine, comprising an operating shaft, a plurality of flange forming rollers pivoted at one end thereto and rotatable therewith and means to expand said rollers by the rotation of said shaft and also manually.

6. A lined pipe flange-forming machine comprising an operating shaft, a plurality of flange-forming rollers carried thereby and rotatable therewith, said rollers pivoted at one end to said shaft, means operated by said shaft to move said rollers outwardly to form the flange, means to restrict the extent of outward movement of said rollers, and means to permit the rotation of said shaft subsequent the restriction of movement of said rollers.

7. A lined pipe flange-forming machine comprising an operating shaft, flange-forming rollers carried thereby, roller pins on which said rollers are rotatably arranged, said roller pins pivoted at one end to said shaft, links pivoted to the other ends of said pins, a thrust ring carried by said shaft to which the other end of said links are pivoted, and roller-expanding mechanism adapted to engage said thrust ring to expand said rollers to form the flange.

8. A lined pipe flange-forming machine comprising an operating shaft, flange-forming rollers carried thereby, roller pins on which said rollers are rotatably arranged, said roller pins pivoted at one end to said shaft, links pivoted to the other ends of said pins, a thrust ring carried by said shaft to which the other end of said links are pivoted, and roller expanding mechanism operated by said shaft.

9. In a lined pipe flange-forming machine, the combination of an operating shaft, driving means therefor, flange-forming rollers expansible to form the flange pivoted at one end to said shaft and rotatable therewith, roller expanding means actuated by said driving means, and means automatically to stop the operation of the machine when the rollers are in flange-formed position.

In testimony whereof I have signed my name to this specification, in the presence of a subscribing witness.

PATRICK A. FOLEY.

Witness:
H. B. DAVIS.